United States Patent
Mueller et al.

(10) Patent No.: US 11,794,102 B2
(45) Date of Patent: Oct. 24, 2023

(54) CLOUD-BASED GAME STREAMING

(71) Applicant: SUPER LEAGUE GAMING, INC., Santa Monica, CA (US)

(72) Inventors: Aaron Mueller, Los Angeles, CA (US); David Steigelfest, Santa Monica, CA (US)

(73) Assignee: SUPER LEAGUE GAMING, INC., Santa Monica, CA (US)

( * ) Notice: Subject to any disclaimer, the term of this patent is extended or adjusted under 35 U.S.C. 154(b) by 0 days.

(21) Appl. No.: 17/169,110

(22) Filed: Feb. 5, 2021

(65) Prior Publication Data
US 2021/0162300 A1    Jun. 3, 2021

Related U.S. Application Data

(62) Division of application No. 16/250,843, filed on Jan. 17, 2019, now Pat. No. 11,260,295.
(Continued)

(51) Int. Cl.
*A63F 13/355* (2014.01)
*A63F 13/352* (2014.01)
(Continued)

(52) U.S. Cl.
CPC .......... *A63F 13/355* (2014.09); *A63F 13/352* (2014.09); *A63F 13/79* (2014.09); *G06Q 30/0277* (2013.01); *A63F 2300/538* (2013.01)

(58) Field of Classification Search
CPC ...... A63F 13/33; A63F 13/335; A63F 13/352; A63F 13/355; A63F 13/49; A63F 13/60;
(Continued)

(56) References Cited

U.S. PATENT DOCUMENTS

| 6,056,640 A | 5/2000 | Schaaij |
| 6,257,982 B1 | 7/2001 | Rider et al. |

(Continued)

FOREIGN PATENT DOCUMENTS

| CN | 1759909 A | * | 4/2006 | ............. A63F 13/12 |
| WO | WO 2016/073035 | | 5/2016 | |
| WO | WO 2020/023403 | | 1/2020 | |

OTHER PUBLICATIONS

"League of Legends—Spectator Mode"—https://www.youtube.com/watch?v=oqT14k6BsC0, Apr. 27, 2012.
(Continued)

*Primary Examiner* — Steven J Hylinski
(74) *Attorney, Agent, or Firm* — POLSINELLI LLP

(57) ABSTRACT

Embodiments of the present invention are directed towards systems and methods of implementing multi-player online games using cloud computing. By using cloud computing (also known as a cloud network), hardware and/or software requirements for running the multi-player online game can be minimized as the game itself would be executed and run using resources available in the cloud network rather than based on local resources, such as a laptop or gaming console. Different users situated at different locations can all be provided access to the same game without the need for the specialized hardware, software, and resource levels.

20 Claims, 9 Drawing Sheets

Related U.S. Application Data

(60) Provisional application No. 62/702,900, filed on Jul. 24, 2018.

(51) Int. Cl.
*A63F 13/79* (2014.01)
*G06Q 30/0241* (2023.01)

(58) Field of Classification Search
CPC .......... A63F 13/69; A63F 13/77; A63F 13/79; A63F 13/85; A63F 2300/40; A63F 2300/403; A63F 2300/407; A63F 2300/50; A63F 2300/213; A63F 2300/531; A63F 2300/538
See application file for complete search history.

(56) References Cited

U.S. PATENT DOCUMENTS

| | | | |
|---|---|---|---|
| 6,346,045 B2 | 2/2002 | Rider et al. | |
| 6,361,438 B1 | 3/2002 | Morihira | |
| 7,278,920 B1 | 10/2007 | Klamer et al. | |
| 7,445,549 B1 | 11/2008 | Best | |
| 7,938,727 B1 | 5/2011 | Konkle | |
| 8,038,533 B2 | 10/2011 | Tsuchiyama et al. | |
| 8,225,194 B2 * | 7/2012 | Rechsteiner | H04N 21/858 715/206 |
| 8,348,760 B2 | 1/2013 | Mao et al. | |
| 8,475,284 B1 * | 7/2013 | Rudi | A63F 13/5258 463/42 |
| 8,556,729 B2 | 10/2013 | Suzuki et al. | |
| 8,632,410 B2 | 1/2014 | Perlman et al. | |
| 8,636,589 B2 | 1/2014 | Harris et al. | |
| 8,795,086 B2 | 8/2014 | Rudi et al. | |
| 8,834,268 B2 | 9/2014 | Kern et al. | |
| 8,864,566 B2 | 10/2014 | Snoddy et al. | |
| 8,874,661 B2 | 10/2014 | Wild et al. | |
| 8,910,309 B2 | 12/2014 | Harrison et al. | |
| 9,067,150 B2 | 6/2015 | Konkle | |
| 9,101,836 B1 | 8/2015 | Brenden et al. | |
| 9,120,019 B2 | 9/2015 | Mescon et al. | |
| 9,174,135 B2 * | 11/2015 | Abe | A63F 13/92 |
| 9,330,726 B1 | 5/2016 | Lawson et al. | |
| 9,369,776 B2 * | 6/2016 | Lanier | H04N 21/6125 |
| 9,403,090 B2 | 8/2016 | Harris et al. | |
| 9,438,937 B1 * | 9/2016 | Buchheit | H04N 5/04 |
| 9,454,993 B1 | 9/2016 | Lawson et al. | |
| 9,526,995 B2 | 12/2016 | Brunstetter et al. | |
| 9,687,745 B2 | 6/2017 | Lin et al. | |
| 9,756,349 B2 * | 9/2017 | Perlman | H04L 65/611 |
| 9,968,856 B1 * | 5/2018 | Ninoles | A63F 13/5252 |
| 10,463,962 B2 * | 11/2019 | Marks | A63F 13/86 |
| 10,543,430 B2 * | 1/2020 | Osman | A63F 13/525 |
| 10,617,945 B1 * | 4/2020 | George | G06F 3/0481 |
| 10,702,771 B2 | 7/2020 | Miller | |
| 10,946,274 B2 | 3/2021 | Miller | |
| 11,260,295 B2 | 3/2022 | Mueller | |
| 2002/0032744 A1 | 3/2002 | Magoshi et al. | |
| 2002/0098885 A1 | 7/2002 | Sakaguchi | |
| 2002/0165630 A1 | 11/2002 | Arthur et al. | |
| 2003/0107647 A1 | 6/2003 | James | |
| 2003/0216185 A1 | 11/2003 | Varley | |
| 2004/0224761 A1 * | 11/2004 | Nishimura | A63F 13/5258 463/33 |
| 2004/0229687 A1 | 11/2004 | Miyamoto et al. | |
| 2005/0014554 A1 | 1/2005 | Walker et al. | |
| 2006/0058103 A1 * | 3/2006 | Danieli | A63F 13/87 463/42 |
| 2006/0229122 A1 | 10/2006 | Macke | |
| 2006/0281546 A1 | 12/2006 | Iwamoto et al. | |
| 2007/0037625 A1 | 2/2007 | Edwards | |
| 2007/0099702 A1 * | 5/2007 | Tupper | A63F 13/355 463/41 |
| 2007/0117617 A1 * | 5/2007 | Spanton | A63F 13/12 463/40 |
| 2007/0270215 A1 * | 11/2007 | Miyamoto | A63F 13/10 463/32 |
| 2008/0016176 A1 | 1/2008 | Leitner | |
| 2008/0125226 A1 | 5/2008 | Emmerson | |
| 2008/0262910 A1 | 10/2008 | Altberg et al. | |
| 2008/0263458 A1 | 10/2008 | Altberg et al. | |
| 2008/0318678 A1 | 12/2008 | Stivoric et al. | |
| 2009/0017913 A1 | 1/2009 | Bell et al. | |
| 2009/0118017 A1 | 5/2009 | Perlman et al. | |
| 2009/0131141 A1 | 5/2009 | Walker et al. | |
| 2009/0221367 A1 | 9/2009 | Longley et al. | |
| 2009/0262112 A1 | 10/2009 | Yoshimura | |
| 2010/0016054 A1 | 1/2010 | Berman et al. | |
| 2010/0020080 A1 | 1/2010 | Iwanaga | |
| 2010/0053435 A1 * | 3/2010 | Goziker | H04N 21/426 348/558 |
| 2010/0304869 A1 | 12/2010 | Lee et al. | |
| 2011/0018890 A1 | 1/2011 | Ford et al. | |
| 2011/0126255 A1 | 5/2011 | Perlman et al. | |
| 2011/0319148 A1 | 12/2011 | Kinnebrew et al. | |
| 2012/0077586 A1 | 3/2012 | Pishevar | |
| 2012/0134651 A1 | 5/2012 | Cottrell | |
| 2012/0299938 A1 | 11/2012 | Iwasaki | |
| 2012/0302341 A1 | 11/2012 | Abe | |
| 2012/0306856 A1 | 12/2012 | Tada | |
| 2012/0306857 A1 | 12/2012 | Hayashida et al. | |
| 2012/0309518 A1 | 12/2012 | Hansen et al. | |
| 2013/0109468 A1 | 5/2013 | Okamura | |
| 2013/0109470 A1 | 5/2013 | Yamashita et al. | |
| 2013/0109473 A1 | 5/2013 | Yamashita et al. | |
| 2013/0143669 A1 | 6/2013 | Muller et al. | |
| 2013/0166697 A1 * | 6/2013 | Manning | H04L 69/18 709/219 |
| 2013/0172086 A1 * | 7/2013 | Ikenaga | A63F 13/00 463/43 |
| 2013/0179308 A1 | 7/2013 | Agustin et al. | |
| 2013/0296045 A1 | 11/2013 | Dun et al. | |
| 2014/0018165 A1 | 1/2014 | Kern et al. | |
| 2014/0038708 A1 | 2/2014 | Davison et al. | |
| 2014/0113718 A1 * | 4/2014 | Norman | A63F 13/822 463/31 |
| 2014/0243082 A1 | 8/2014 | Harris et al. | |
| 2014/0248963 A1 | 9/2014 | Tulleken | |
| 2014/0274297 A1 | 9/2014 | Lewis et al. | |
| 2014/0274379 A1 | 9/2014 | Justive et al. | |
| 2014/0287806 A1 | 9/2014 | Balachandreswaran | |
| 2015/0367238 A1 * | 12/2015 | Perrin | A63F 13/355 463/29 |
| 2016/0127508 A1 * | 5/2016 | Perrin | A63F 13/79 709/219 |
| 2016/0166926 A1 | 6/2016 | Hussman et al. | |
| 2016/0279509 A1 | 9/2016 | Miller | |
| 2016/0279511 A1 * | 9/2016 | Miller | A63F 13/26 |
| 2016/0345035 A1 | 11/2016 | Han et al. | |
| 2016/0360267 A1 * | 12/2016 | Marilly | H04N 21/4728 |
| 2016/0381408 A1 * | 12/2016 | Triano | H04N 21/8549 725/10 |
| 2017/0087464 A1 | 3/2017 | Perry et al. | |
| 2018/0167656 A1 | 6/2018 | Ortiz et al. | |
| 2018/0243650 A1 * | 8/2018 | Baszucki | A63F 13/355 |
| 2018/0288133 A1 | 10/2018 | Colenbrander | |
| 2019/0336867 A1 | 11/2019 | Verma et al. | |
| 2020/0016495 A1 * | 1/2020 | Cruz | A63F 13/48 |
| 2020/0030697 A1 * | 1/2020 | Mueller | A63F 13/77 |
| 2020/0066093 A1 | 2/2020 | Schwartz | |
| 2020/0230499 A1 | 7/2020 | Buser et al. | |
| 2020/0330862 A1 | 10/2020 | Miller | |
| 2021/0370177 A1 | 12/2021 | Li | |

OTHER PUBLICATIONS

PCT Application No. PCT/US2015/029532 International Preliminary Report on Patentability dated May 9, 2017; 6 pages.
PCT Application No. PCT/US2015/029532 International Search Report and Written Opinion dated Jul. 30, 2015.
PCT Application No. PCT/US2019/042859 International Preliminary Report on Patentability dated Jan. 26, 2021.

(56) References Cited

OTHER PUBLICATIONS

PCT Application No. PCT/US2019/042859 International Search Report and Written Opinion dated Nov. 27, 2019.
U.S. Appl. No. 15/179,868 Office Action dated May 1, 2020.
U.S. Appl. No. 15/179,868 Final Office Action dated Dec. 27, 2019.
U.S. Appl. No. 15/179,868 Office Action dated Aug. 19, 2019.
U.S. Appl. No. 15/179,868 Final Office Action dated Nov. 9, 2018.
U.S. Appl. No. 15/179,868 Office Action dated Feb. 27, 2018.
U.S. Appl. No. 15/179,868 Final Office Action dated Jun. 6, 2017.
U.S. Appl. No. 15/179,878 Office Action dated Nov. 1, 2019.
U.S. Appl. No. 15/179,878 Final Office Action dated May 30, 2019.
U.S. Appl. No. 15/179,878 Office Action dated Dec. 18, 2018.
U.S. Appl. No. 15/179,878 Final Office Action dated Jul. 27, 2018.
U.S. Appl. No. 15/179,878 Office Action dated Feb. 23, 2018.
U.S. Appl. No. 15/179,878 Final Office Action dated Apr. 10, 2017.
U.S. Appl. No. 16/250,843 Non-Final Office Action dated Feb. 17, 2021.
U.S. Appl. No. 16/922,877 Final Office Action dated Nov. 8, 2021.
U.S. Appl. No. 16/922,877 Office Action dated Aug. 23, 2021.
U.S. Appl. No. 16/250,843 Non-Final Office Action dated Aug. 3, 2021.
U.S. Appl. No. 16/922,877 Office Action dated Feb. 22, 2022.

\* cited by examiner

CLOUD-BASED GAME STREAMING

CROSS REFERENCE TO RELATED APPLICATIONS

The present application is a divisional of U.S. patent application Ser. No. 16/250,843 filed Jan. 17, 2019, which claims priority to and the benefit of U.S. provisional patent application 62/702,900 filed Jul. 24, 2018, the disclosures of which are incorporated herein by reference.

BACKGROUND OF THE INVENTION

1. Field of the Invention

The present invention generally relates to online video games and online streaming. More specifically, the present invention relates to cloud-based implementations for online video game streaming.

2. Description of the Related Art

Cloud computing, also referred to as a cloud network, provides online access to digital resources (e.g., over the Internet) from anywhere in the world. Access to the resources in cloud network is provided to any accessing devices with Internet connectivity. Streaming media is multimedia that is constantly being received by and presented to an end-user while being delivered by a provider. A client end-user can use their media player to start playing the data file (such as a video) before the entire file has been transmitted. The content file does not have to be downloaded in its entirety before the user views the file. Exemplary streaming services (e.g., Twitch) provide individuals with access to multimedia in real-time from a variety of different content creators (e.g. streamers). For example, streamers may provide viewers with their real-time in-game perspective of a video game being played.

Presently, electronic games can be run on one or more user devices (e.g., game consoles, computers, mobile devices). Some game titles require specialized computing devices (e.g., gaming consoles) or software applications, each of which may have different technical requirements to operate. For example, different game titles may require extensive computing resources (e.g., processing power, memory, graphics processing, bandwidth) to run a game session. The resources may increase with the number of user devices associated with different players that are playing the game, as increasing amounts of data is being generated, communicated, processed, and rendered at the same time. For example, each player playing an electronic game can provide their input to the game using peripherals connected to the user devices (e.g., keyboards, mice, and controllers). Each of these inputs would need to be received and processed in order to identify what each user intends to do in the electronic game. Furthermore, updates would need to be performed regarding the digital game environment and the status of each of the players playing within the electronic game. Lastly, the updates would need to be provided to each player.

Specific electronic game titles can allow for multiplayer gameplay where two or more players play simultaneously within the same digital game environment. Several examples of multiplayer video games include fighting games, first-person shooting games, racing games, sports-based games, and role-playing games.

Multiple players can play simultaneously on the same gaming console or over communication networks (e.g., local area networks, Internet). In some instances, multiplayer video games can be simultaneously played by multiple players from all over the world, whether competitively or cooperatively (e.g., in teams). The Internet or cloud allows for communication of gameplay data among massive numbers of user devices that may be remote from each other. The user devices can provide such gameplay data as, for example, character position, character status, and so on. Alternatively, in some implementations each user device can communicate with a game server controlled by a third party (e.g., the game publisher or developer) that maintains the game related information.

Multi-player online games are video games where two or more participants participate within a specific setting for specific objectives or for a limited amount of time. For example, games such as League of Legends involve multiple players who compete against other players in order to accomplish a goal (e.g. destroy the opposing team's base). The multi-player aspect of the game is generally carried out using the Internet or computing network (e.g. local area network) so that players on their respective computing devices (e.g. game console, laptop, desktop, mobile device) can access the same game (or more specifically the same game instance).

In some instances, a subset of players (e.g., a particular team) may wish to play together in real life. Leagues may be organized, therefore, between teams in different cities. With large numbers of potential spectators, however, user device displays (e.g., laptops, mobile devices) would be too small for a room of spectators to view what is occurring within the game. Furthermore, it would be difficult to follow multiple different user device display simultaneously. As such, a local projection view system may be used to process game data to generate a display to be projected onto a projection screen (e.g., a movie screen). Such a local projection view system may include, inter alia, local access point, firewall/router, cradle point/modem, and web server (or other computing device). The local projection view may include a selection of one of the user device perspectives (e.g. random selection).

It may also be possible that a perspective of the game environment that is different from any specific user device's perspective is also provided on the projection screen. Whereas each user device may include user-specific (e.g., character-specific first-person) point of view, the projection view may not correspond to any particular user or character. Other local services may be provided via such local projection view system. Such local projection view system may be highly dependent on, however, and restricted by the local resources that are available.

Therefore, there is a need in the art for improved systems and methods of cloud-based game streaming.

DETAILED DESCRIPTION

Embodiments of the present invention are directed towards systems and methods of implementing and streaming multi-player online games using cloud computing. By using cloud computing (also referred to as cloud network), hardware and/or software requirements for running the multi-player online game can be minimized as the game itself would be executed and run using resources available in the cloud network rather than based on local resources, such as a laptop or gaming console. Different users situated at different locations can all be provided access to the same game without the need for the specialized hardware, software, and resources as these will be available via emulation within the cloud network.

With having the game being run using the cloud network (e.g. "in the cloud"), the game data and computing resources would be available in the cloud via emulation so that the same emulated resources could be used in creating individualized streams of the game session for different viewers (or spectators). In particular, multiple different streams can be generated and maintained simultaneously using the same game data and computing resources that is in the cloud network. Furthermore, the different streams can be customized for each different location, team, user, etc., being provided access to the stream on their respective computing device. Since the streams are processed and customized for each different location all within the cloud network, resource requirements for displaying the stream at each different location is minimized.

Another improvement of having the game information and computing resources accessible in the cloud network would be to allow users to switch between different streams. Instead of requiring set up of each new stream for each new request (which may require identifying the source of a new stream from a different computing device, initiating the capture of game data from that different computing device, and processing the game data so that it can be provided to the viewer/spectator) any existing stream that is already within the cloud network can be accessed by the different spectators.

Additionally, with the game being run in the cloud network, implementation of additional views of the game—where such views may not be originally available within the online game—based on customized requests of one or more viewers can also be fulfilled. These additional views may be implemented via special camera characters that can be manually or automatically controlled within the game environment via the cloud network. Automated control of such camera characters may be customized to any variety of specifications as desired based on the capabilities of the corresponding online game.

Figure 1:
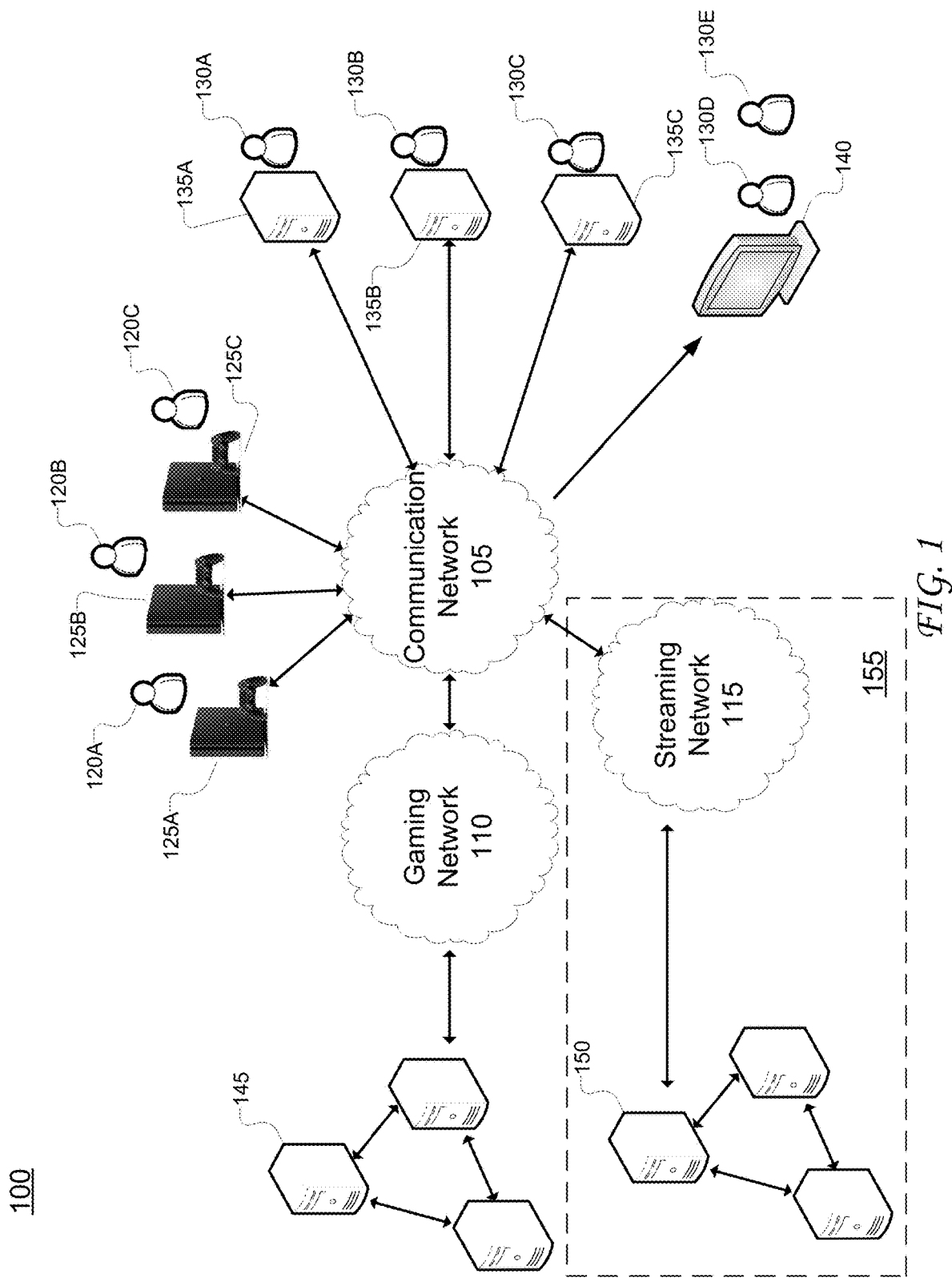
FIG. 1 is an exemplary network environment in which a system for streaming network games may be implemented.

FIG. 1 is an exemplary network environment 100 in which a system for game streaming may be implemented. The network environment 100 may include a gaming network 110 (associated with one or more gaming servers 145), the cloud network 155 (inclusive of streaming network 115 and associated cloud servers 150), and communication network 105 (e.g., Internet). The communication network 105 in particular allows for various players 120A-C (on gaming devices 125A-C) and spectators 130A-E (on viewing devices 135A-C and/or projection device(s) 140), respectively to access, participate, and/or view games available through the gaming network 110. Furthermore, various game-related services may be provided as streams through the cloud network 155.

By having many of the features (e.g. processing, resources) associated with the cloud network 155, there are less requirements for any specific hardware and/or software to be installed and spun up at each location associated with each of the players 120A-C and/or spectators 130A-E to provide a consistent gameplay experience and one that is delivered at a consistent level of quality. Each local user device would only need a connection to the communication network 105 (e.g. Internet) for access the cloud network 155 in order to participate in a game and/or receive a customized stream of the game.

The quality of access of users participating in a session of the online game and/or users viewing the stream at each local device would receive from the communication network 105 (from the gaming network 110 and the streaming network 115, respectively) may be based on, for example, the resources and capabilities (e.g. applications, processing,) available at each local device. For example, a first local device having less processing resources or lesser display capabilities than a second local device may have their access or stream of the game be customized so that the game can be played or viewed on the first local device without lag or delay. The second local device would be able to access or view the same game using a different stream that would provide a different experience based on the difference in processing resources or display capabilities compared to the first local device.

In another embodiment, a third local device may be lacking certain features (e.g. display application) that would facilitate in the participation of the game or viewing of the stream. The communication network 105 may have designated resources available within the cloud network 155 that would be used to provide such features to computing devices (e.g. default display application, game client) that can be used by the third local device.

The communication network 105—which may be inclusive of local and wide area networks—communicatively couples all the different computing networks (e.g. gaming network 110, streaming network 115) and devices (e.g. gaming devices 125A-C, viewing devices 135A-C, projection device(s) 140) within the network environment 100. The communication network 105 also provides the cloud network 155 communicative connections with the gaming devices 125A-C, viewing devices 135A-C, and projection devices 140. In this way, the cloud network 155 would be able to receive game data regarding gameplay, specific user inputs from the gaming devices 125A-C, and requests from viewing devices 130A-C (in connection with customized spectator views). Using this same communication connection, the communication network 105 can also be used to transmit updates of the game back to the respective players on their gaming devices 125A-C, as well as transmit the streams of the online game to the viewing devices 135A-C and projection device(s) 140.

Gaming devices 125A-C provide data game actions performed by players 120A-C to the communication network 105, which may then be used to process subsequent game events and provide the updates back to the players as well as used in the customized game streams. For example, if the players 120A-C are all participating within the same racing game, user inputs related to how each player 120A-C would perform steering, accelerating, and braking of their vehicle will be received (via respective controller or keyboard peripherals associated with the gaming devices 125A-C) and sent to the cloud network 155. The user inputs are used to instruct how each in-game character associated with each player 120A-C performs within the game. This allows the state of the game to be updated and maintained for the multi-player online game experience within the cloud network 155. Such data may further be analyzed by the cloud network 155 in real-time to provide customized displays for those participating within the game. For example, if the cloud network 155 is able to identify that a particular player has a higher latency than the other players, it may be decided that reducing the quality of the display (e.g. frame rate, resolution) for that particular player would allow for that player to participate within the same game with less of a delay thereby placing the player on a more even playing level compared to prior the modification of the display.

Furthermore, the communication network 105 would also receive user inputs/requests from the viewers 130A-C on their respective viewing devices 135A-C requesting access to view one or more streams of online games. For example, the viewers 130A-C can request access to view particular games or specific stream of games. The viewers 130A-C could also request customization of the streams being displayed on their respective viewing devices 135A-C. For example, if a particular viewer's location corresponds to a particular team, location-specific information about that team can be provided (as opposed to information about other teams or players). Third party content (e.g. advertisements) can also be customized and provided to specific viewers based on their specific location and/or preferences as well. Other customization can also include how the stream is displayed on their viewing device such as how the stream is arranged with additional content or implementation of user interfaces.

Viewers 130A-C could also request specific views of events or players within the multi-player online game from the cloud network 155. Viewers 130A-C may be able to select different available views of the game from the perspective of one or more participants using their viewing device 135A-C. The views provided may correspond to views of current players participating within the game (on their respective gaming devices). For example, the viewer 130A-C may request a view of a particular player 120A-C (e.g. fan favorite) or a view of a particular location within the game environment. If a requested view is not available, the viewer 130A-C may request the cloud network 155 to create a custom view—described below in connection with the creation of an in-game camera character. Generally, the cloud network 155 would request a custom camera character within the game and control the custom camera character based on pre-defined conditions (e.g. following specific players, viewing specific events). Viewers 130A-C may also be allowed to control the custom camera character within the game environment so that viewers can manually control what the viewer 130A-C sees on their viewing device 135A-C within the game environment. It may also be possible that the views being provided by one viewer (via manual control of the in-game camera or custom camera character) can be shared or made available for access by other viewers. This would allow one viewer, such as a commentator, to share the same images of events or in-game characters being commented on within the game environment.

The information provided from the streaming network 115 along with the game data in the gaming network 110 can then be transmitted back to the viewing devices 135A-C or the projection device 140 so that the viewers 130A-C can view the events or participants within the game. The streaming network 115 provides additional information (e.g. context) that can be included with the stream of the online game for viewers to view. For example, information such as game title, status of each of the players, and the current state of the game (e.g. scores for each of the players/team) can all be included with the stream. Some embodiments may have the additional information organized in a heads-up display (or HUD) so that the view of the streamed gameplay on the viewing device 135A-C or the projection device 140 is not obstructed. The heads-up display (or HUD) pre-defines portions of a display to contain certain information related to the stream. For example, information about all players could be provided in a table at the bottom of a display while specific information for a highlighted player could be provided in a different area of the display. The HUD presented at each location may also include information that is location-specific (e.g., team-specific). The HUD may also include game data filtered and presented from the perspective of the particular location and/or team. Viewers may also add or remove information in the HUD as well as relocate where such information is displayed as desired.

The gaming network 110 provides the cloud network 155 with features (e.g. game play functions, game data) needed to run and manage the multi-player online game in the cloud network 155. For example, game data about the game environment, characters within the game, player characters, objects, and rules for maintaining the game environment may all be provided by the gaming network 110. Instead of running the instances of the multi-player online game on the respective gaming servers 145, the cloud network 155 can be used instead.

Typically, management of the gaming servers 145 are associated with a company associated with the game although third parties separate from the company may also be associated with the management of the gaming servers 145. The information included in the gaming servers 145 would be used to initiate, run, and maintain the instances of the game being run online. With the use of the cloud network 155, the gaming network 110 can instead have the information needed for initiating, running, and maintaining the instances of the game be associated with the cloud network 155 instead of the gaming servers 145. The information for the gaming network 110 may initially be provided by the corresponding gaming servers 145. However, once provided, the cloud network 155 can be used to run the online game.

By having the game information stored in the gaming network 110, the cloud network 155 is able to reduce requirements for local resources to run games by allowing the processing of gameplay information to be performed in the cloud network 155 rather than requiring such processes to be performed locally on each local gaming device 125A-C. This allows the removal of necessary hardware devices (e.g. gaming consoles) and/or software applications (e.g. gaming applications) at each location associated with the players. This is possible since all the data for running the multi-player online game is processed and streamed from the cloud network 155; the gaming devices 125A-C would not need to be utilized to process inputs from players, update game states, or generate displays for the players. As a result, the devices (e.g. gaming devices 125A-C, viewing devices 135A-C, projection device 140) need only be capable of receiving information from the cloud network 155 in order to participate within an online game as a player or to view the stream of the online game as a viewer/spectator. With the game data from each of the players 125A-C participating in the online game as well as any customization or requests to view streams from spectators 130A-E of the online game being processed in the cloud network 155, local resources required to process the corresponding information for players and spectators alike are reduced to any computing device capable of receiving information (e.g. a stream) from the cloud network 155. Furthermore, viewing devices 135A-C may also need an additional feature of being able to provide the information (e.g. stream of the online game) to a to a display device (e.g., projector) via methods such as using an HDMI cable or some computing network (e.g. LAN/Wi-Fi). With respect to gaming devices 125A-C, each may further need to at least have the ability to receive an input via a peripheral (e.g. controller, keyboard) from the associated player 120A-C so that the gaming network 110 would be able to update the state of the game based on the actions of each participant.

The streaming network 115 includes features that allow for generating, filtering, and otherwise manipulating the game data for the customized streams provided to spectators. The streams may further be combined with additional data to further customize the streams based on the location, device, or user requesting the stream (e.g. generating HUDs, providing different in-game cameras). As such, customized streams may be provided to different viewers 130A-E on their respective devices 135A-C or, alternatively, on a projection display 140. To reduce the requirements for each of the viewing devices 135A-C and projection device 140 needed to view the stream, the necessary processing can be performed in the cloud network 155. For example, the processing of the data and generating the streams so that the stream is compatible with the viewing device is performed in the cloud network 155. Furthermore, customization of the heads-up display (HUD) to include localized information based on a viewer's physical location is also processed and generated in the cloud network 155. The HUD can also be customized to include user specific requested information pertaining to a particular view the viewer 130A-C has on display on their viewing device 135A-C.

Since the processing is performed in the cloud network 155 (as described above), the data for the stream that is provided from the cloud network 155 to the viewing device 135A-C and/or projection display 140 only needs to be displayed with no further processing needed to be performed by the viewing device 135A-C and/or projection display 140. At minimum, an Internet connection from the viewing device 135A-C and/or projection display 140 to the communication network 105 would be needed so that the data from the cloud network 155 can be provided to the respective viewing device 135A-C and/or projection display 140. In this way, it may be possible that the viewers would not need specialized computing device and/or application in order to process, render, or otherwise access the gameplay stream coming from the cloud network 155. This is because the different processes for generating the stream such as identifying in-game events, identifying which in-game events to display, and related graphics processing and rendering would be performed in the cloud network 155.

Figure 2:
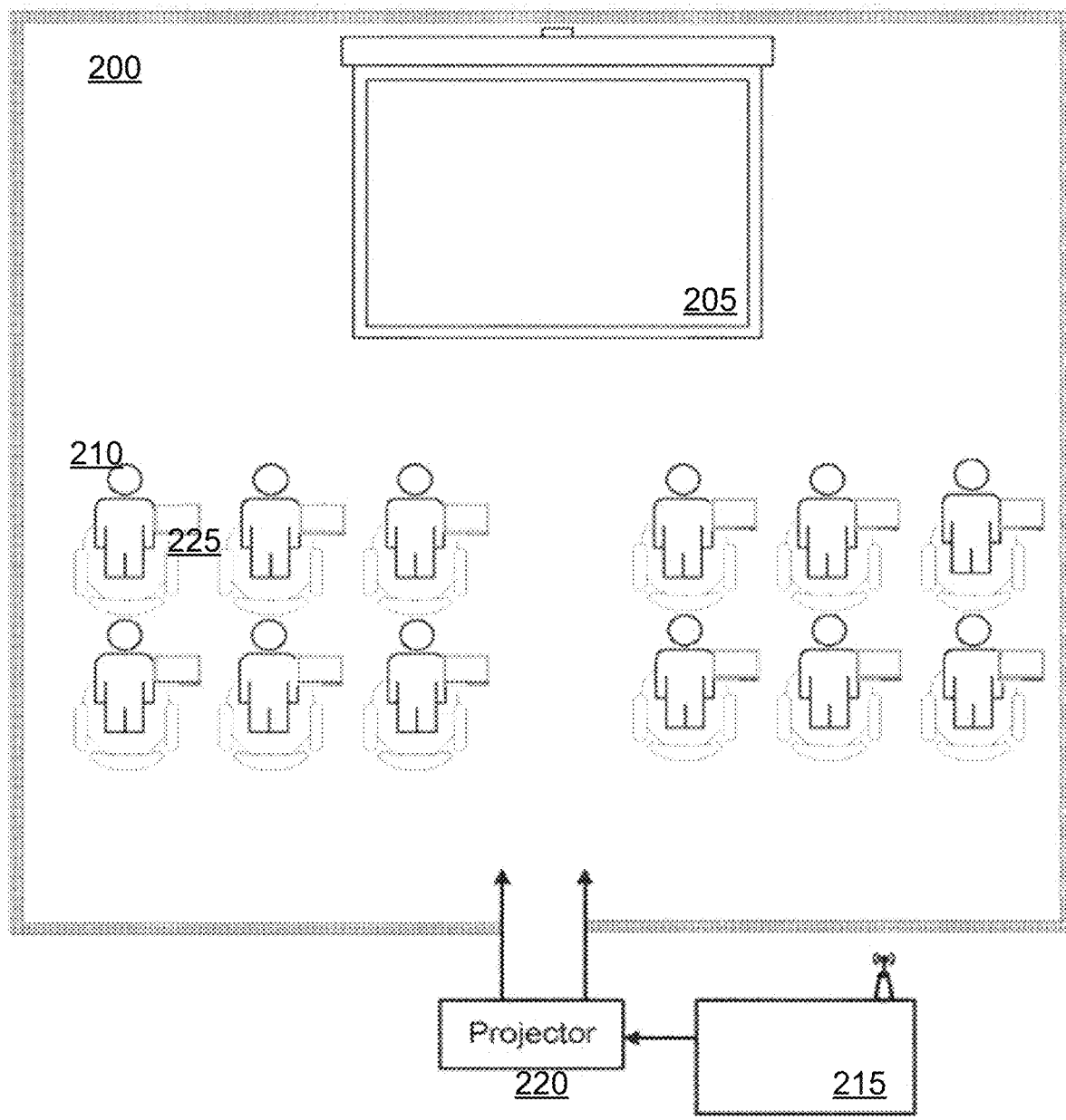
FIG. 2 is an exemplary local environment that may be part of the network environment of FIG. 1.

FIG. 2 is an exemplary local environment 200 that may be part of the network environment 100 of FIG. 1. The local environment 200 may include a space (e.g., movie theater, stadium, auditorium) that can be used to display a stream of gameplay data on projector display 205. A projector 220 can be associated with the projector display 205 so that the projector 220 is able to project the gameplay data onto the projector display 205 in situations where the projector display 205 is not capable of communicating with the cloud network. So long as the projector 220 of projector display 205 is able to access the Internet (either directly or via a cable connection to a device 215 that can access the Internet), the projector display 205 can receive a customized stream directly from the Internet through the projector 220. It may be possible, however, that the projector display 205 is able to receive the data directly from the cloud network, if for example, the projector display includes corresponding communication features capable of connecting the projector display 205 with the Internet.

The contents of what is displayed on the projector display 205 can be customized based on a variety of parameters. In some embodiments, manual control of a camera within the multi-player online game may be provided to a host or commentator who provides a guided tour of events occurring within the multi-player online game. The control of an in-game camera provides for controlled views of the game environment. The camera may also be focused on particular events and/or players within the multi-player online game.

Alternatively, various automated controls may be implemented by the cloud network so as to track certain players and/or identify certain events of interest within the multi-player online game. For example, automated controls may be associated with pre-defined instructions that are executed to instruct a camera character within the multi-player online game to be moved to certain locations within the game in order to provide an overview of the game environment (e.g. overhead view), for example, and to generate different close-up views for events meeting certain criteria (e.g., when a football player is carrying the football, when a character nears a goal). For example, triggers or conditions can be established prior to the start of each multi-player online game that defines what events are important or which players may be interesting to follow. In situations where there are multiple triggers or conditions that are detected within the same period of time, a ranking of triggers or conditions can be established that compare which event or player should be displayed on the projector display 205. The ranking of the hierarchy of triggers or conditions can be influenced based on a determined popularity level of particular players or pre-determined events meeting certain criteria within the multi-player online game (e.g. poll/survey before and/or during the progression of the game). Such triggers may be customized and refined over time, either based on artificial intelligence, machine learning, and/or express preferences. Viewers 210, using their viewing devices 225, may also be allowed to provide input (e.g. polls, surveys) that influences which players and/or events are displayed on the projector display 205, there by modifying an initial hierarchy of triggers from what was initially established.

Whenever a player and/or event is detected that corresponds to a trigger within the multi-player online game, the game data associated with the stream may be obtained from the cloud network 155 and processed for display on the projector display 205. The projector display 205 may provide a view of the game based on the trigger for a pre-determined period of time, until the event concludes, or until the player leaves the area or game.

After the current viewed trigger has been concluded (or perhaps moments before the viewed trigger is to be concluded), a next trigger may be found within the multi-player online game by the cloud network to replace the view displayed on the projector display 205. In order to prevent the same event or player from being displayed multiple times within a short period of time, the hierarchy can be modified (albeit temporarily for a period of time) by the cloud network in order to place the recent trigger for an event or player lower on the overall hierarchy so that other triggers can be selected if detected. The modification can be implemented by the cloud network using a rate of decay (or weights) that can modify the ranking of the trigger on the hierarchy to be lower as the trigger is selected multiple times over a period of time. The hierarchies for the triggers can be reset after the period of time has elapsed (e.g. after a new game has begun). Alternatively, the rate of decay (or weight) can be reversed over time (e.g. every 30 minutes) as well. The rate of decay (or weights) can be adjusted based on viewer input.

Each of the viewers 210 within the space 200 can also be provided respective viewing devices 225. Whereas the display of the stream on the projection display 205 may be out of the direct control of each viewer (e.g. the viewer is not able to select specific views or control what is displayed), each individual viewer 210 could be provided the opportunity to customize what is being viewed on their respective viewing device 225. For example, the viewer 210 can request game-related information that can be viewed about the game being displayed on the projector display 205. A heads-up display (or HUD) can be generated that includes the viewer requested game-related information alongside the image displayed on the projection display 205. Other views (associated with other events or players) can also be provided on the viewing device 225.

By using their respective viewing device 225, each viewer 210 could be allowed to transmit a request to the cloud network for customized viewing of the same event to be displayed on the projection display 205. Based on each viewer 210 request, specific information about the game instance can also be obtained from the cloud network 155 and displayed accordingly on their respective viewing device 225. For example, a viewer 210 may request information from the cloud network about a different player competing in the multi-player online game than the playing currently being displayed on the projector display 205. Details about that different player can be provided from the cloud network to the viewing device 225 associated with the viewer specifically requesting that information.

A benefit of providing the ability for each viewer 210 to view their specifically requested information on their respective viewing device 225 is that other viewers also viewing the same online game on the projector display 205 would not have extraneous information blocking view of the stream (e.g. these other viewers may not be interested in the same type of information). Whereas one person may be interested in having statistics about a particular player being displayed on the projector display 205, other people may not be interested or prefer other information to be viewed.

In addition, each viewer 210 would be allowed to request and display any number of different types of information about the online game on the project display 205. If enough viewers 210 (e.g. majority of those viewing) request viewing the same player or event, the current in-game view of that requested player (or event) can replace the current view being displayed on the projector display 205.

As described above, viewers 210 can utilize the viewing device 225 to influence the type of events and/or players being displayed on the projector display 205. For example, viewers 210 can modify the hierarchy and the rate of decay (or weight) that influences which players or events are chosen by the cloud network to be shown at the projector display 205. Viewers 210 could provide inputs that influence the ranking of players and/or events and their corresponding triggers used to obtain in-game data for display on the projector display 205.

Although the figure illustrates an exemplary setup using a space such as a movie theater, it is possible that other spaces (such as stadiums, auditoriums, classrooms) can also be used. Since there is no need for specialized hardware and/or software at a location to receive and/or project the stream from the cloud network 155, any display device (e.g. smart TV) that is able to access the Internet could be used to receive the stream directly from the cloud network 155. Even if the display device is not able to access the Internet, an accompanying computing device 215 (e.g. laptop, desktop) or projector can be set up to receive the data from the Internet and transmit it to the display device, for example, over a local area network. This allows the setup requirement of streams for events to be minimized and allows the implementation of such streaming events at a variety of different venues to be possible.

Figure 3:
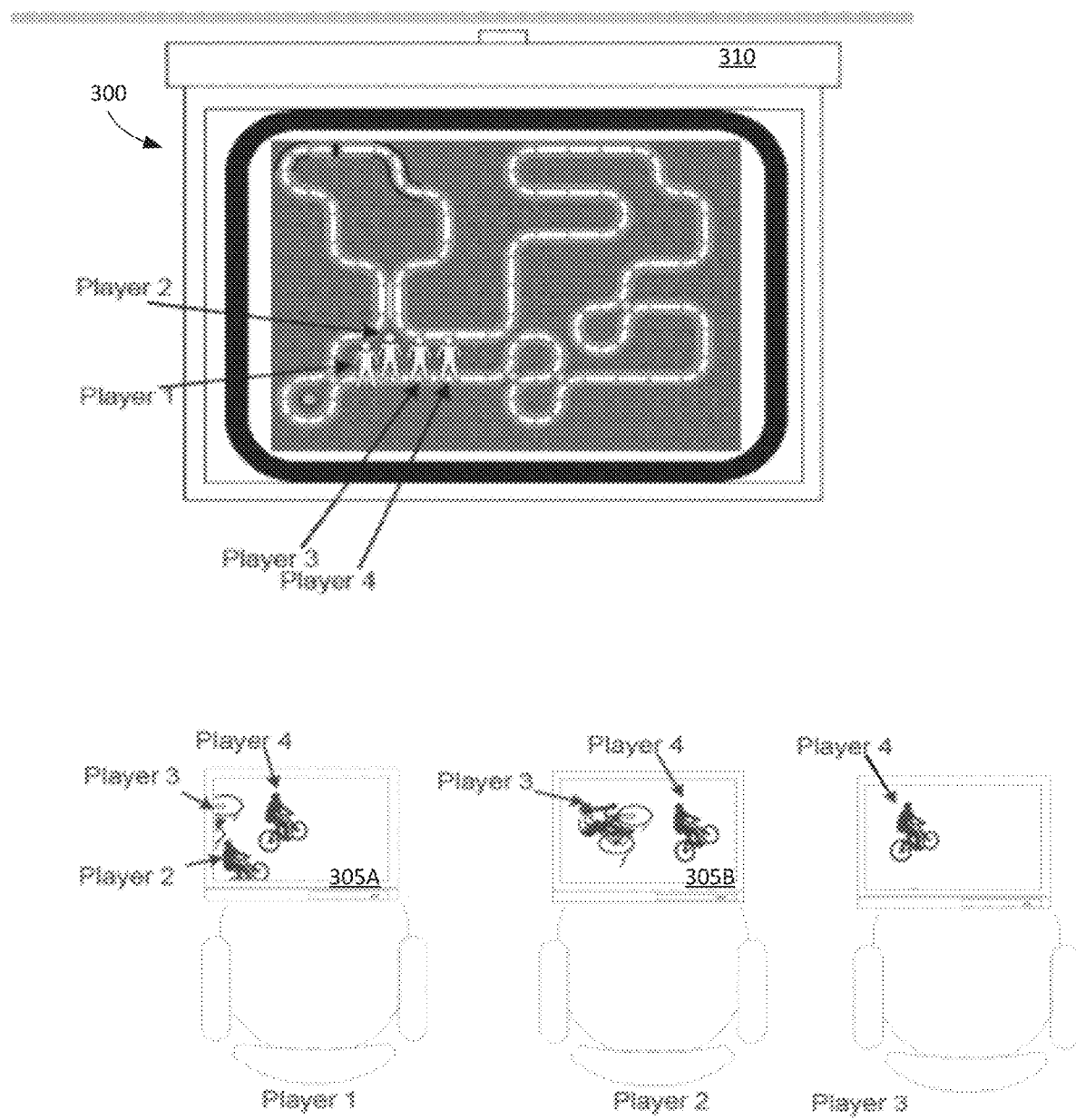
FIG. 3 is an illustration of an exemplary game projection view and corresponding player views.

FIG. 3 is an illustration 300 of an exemplary game projection view and corresponding player views. The exemplary game projection view 310 can be one that is shown, for example, in the projection display 205 within the space 200 illustrated in FIG. 2. In the example illustrated in the figure, four players (e.g. Player 1-Player 4) may be participating in the same racing game on their respective gaming devices 305A-B. Each of the players may have different views of the same game. For example, Player 1 may have a first person view of his/her perspective within the race in relation to Player 2, 3, and 4 displayed on their gaming device 305A. This first person view represents that Player 1 is behind the other players. Since Player 2 is ahead of Player 1, the gaming device 305B would display a corresponding first person view that has Players 3 and 4. The other displays associated with the gaming devices of Players 3 and 4 would similarly have their view within the game based on their position in the race.

Corresponding to the projector display of FIG. 2, the exemplary game projection view illustrated in FIG. 3 includes a projection view 310 that is used to display a different view of the game compared to the views provided to the respective players on their gaming devices 305A-B. For example, the projection view 310 can be a view of all players participating in the race on an overhead map. This different view provided via the projection view 310 could be used to provide a quick way for spectators (and players) to identify their rank against other players. Other views are also possible as well. For example, on the last lap, the view of the finish line can be provided so that viewers would be able to view the moment when the first player crosses the finish line. If an accident in the race occurs, the viewer of the accident can be brought up as well.

In embodiments where the exemplary game projection view 300 allows spectators (and players) to view the events of the multiplayer online game, the projection view 310 can also be used to select a view point belonging to a particular player and display that for others to see. As discussed in this application, the conditions for choosing which view within the online game is displayed in the projection view 310 can be automated. The selection of the particular player view can be based, for example, on triggers or pre-determined rules/criteria. For example, there may be a determination regarding a ranking of players identified as being "fan-favorites" or players most likely to succeed (e.g. the player who is in the lead). The projection view 310 may automatically cycle between the different views belonging to these players in order to allow spectators in the space to see different players and/or events occurring within the game. If an event (e.g. someone beginning their last lap, accidents) is detected, the projection view 310 may be instructed to swap to a view of the associated player that is associated with that event. It may also be possible that individuals (e.g. administrators, commentators) are able to select particular views to display on the projection view 310 that may be perceived as being interesting or related to current discussions or commentary.

Figure 4:
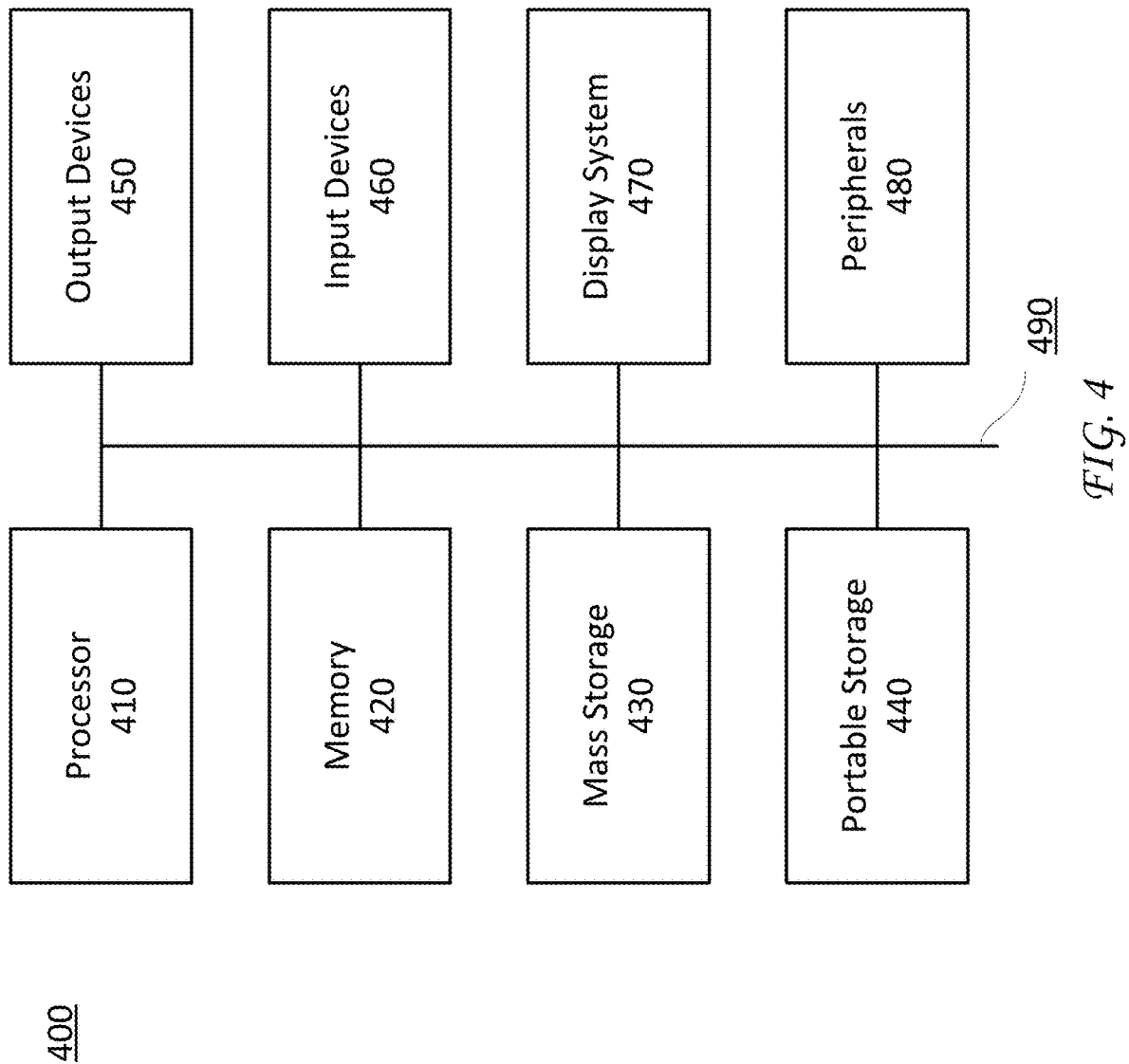
FIG. 4 is a diagram of an exemplary user device that may be used with systems for streaming network games.

FIG. 4 is an exemplary user device 400. User device 400 (e.g., desktop, laptop, tablet, mobile device, console gaming system) is a device that the user can utilize to facilitate carrying out features of the present invention pertaining to the cloud-based implementation of online video game streaming. The streaming would allow users to participate in an online game and/or view a stream of the online game on their client devices without the need for specialized hardware and/or applications.

The user device 400 of FIG. 4 includes one or more processors 410 and memory 420. Main memory 420 stores, in part, instructions and data for execution by processor 410. Main memory 420 can store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. However, the components may be connected through one or more data transport means. For example, processor unit 410 and main memory 420 may be connected via a local microprocessor bus, and the mass storage device 430, peripheral device(s) 480, portable storage device 440, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 420.

Portable storage device 440 operates in conjunction with a portable non-volatile storage medium, such as a floppy disk, compact disk or Digital video disc, to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices 450 include speakers, printers, network interfaces, and monitors.

Display system 470 may include a liquid crystal display (LCD) or other suitable display device. Display system 470 receives textual and graphical information, and processes the information for output to the display device.

Peripherals 480 may include any type of computer support device to add additional functionality to the computer system. For example, peripheral device(s) 480 may include a modem or a router. Furthermore peripherals 480 may also include keyboard, touchpads, or controllers that further adds input functionality to the computer system.

The components contained in the computer system 400 of FIG. 4 are those typically found in computer systems that may be suitable for use with embodiments of the present invention and are intended to represent a broad category of such computer components that are well known in the art. Thus, the computer system 400 of FIG. 4 can be a personal computer, hand held computing device, telephone, gaming console, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

Figure 5:
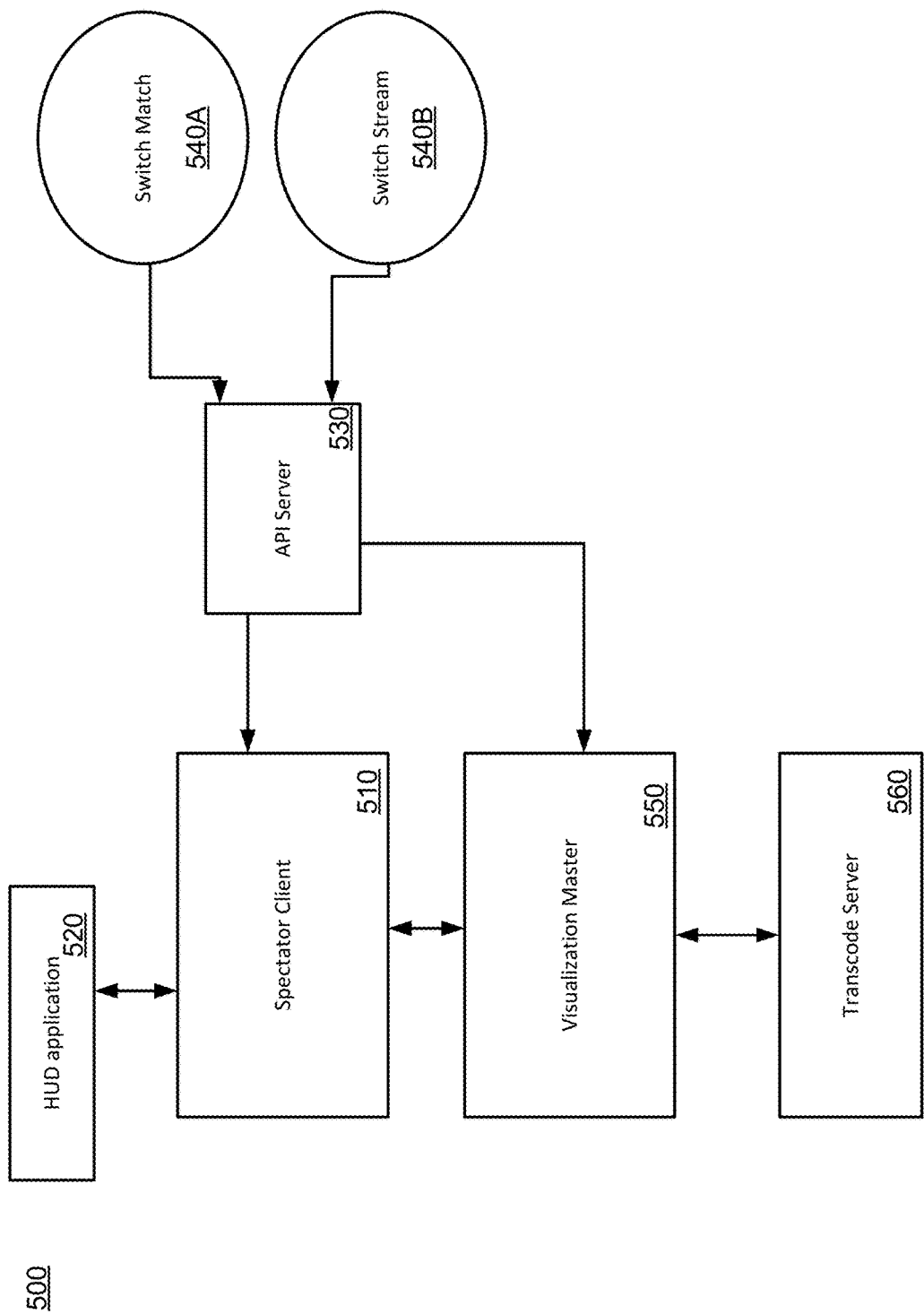
FIG. 5 is a diagram of an exemplary system for streaming network games.

FIG. 5 is a diagram of an exemplary system 500 for streaming network games. Such a system 500 may be located in the cloud network of FIG. 1 and may involve one or more of the cloud servers. The system 500 of FIG. 5 can therefore be used to support a variety of different cloud-based game streams. An example of an online game run using the cloud network may include League of Legends (LoL). An exemplary implementation of game streaming involving LoL may involve configuring a spectator client 510 in the cloud network. Each spectator client 510 may be specific to a game (such as LoL) and have, for example, specific application programming interfaces (APIs), music, and HUD data used during the running and management of the online game. The spectator client 510 can also include spectating modules that obtains the customized views within the online game.

The HUD data may be generated by the cloud network (via the HUD application 520) thereby allowing for game environment views to be streamed and displayed in conjunction with up-to-date data about the current game, concurrent games, other teams, tournament statistics, as well as other data specific to a location, team, player, etc. The HUD data is generated in the cloud network (via the HUD application 520) and provided to the spectator client 510 as needed. The spectator client 510 is able to process the data specific to the online game (e.g. LoL) so that the game data can be provided to a variety of different players and/or viewers alike on their respective devices.

The HUD application 520 may also access information specific to each viewer such as user preferences, specific location of the viewer, or a particular device being used by the viewer to watch the stream. By using specific information associated with each viewer, the HUD application 520 could be customized to include specific data in the HUD for each viewer. For example, a viewer's location can indicate that a particular team's information (e.g. the team closest to the viewer's location) should be generated and provided to the spectator client 510 for that viewer. Similarly, viewer preferences regarding particular preferred teams or favorite players can also influence what HUD data is generated and provided by the cloud network to the spectator client 510 for that viewer.

The cloud network may include an API server 530 that stores and manages APIs for a variety of different game titles and applications. Various API calls, responses, and checks may therefore be routed through the API server 530 to obtain and verify processes related to the game or application in question. For example, when a viewer requests switching between streamed matches 540A or between different streams 540B, these requests can be transmitted to the API server 530 so that the appropriate calls, responses, and checks can be performed for the related game. In an embodiment, a request to switch between different streams 540B received by the cloud network can be used to provide notification to the visualization master 550 that a new stream needs to be pulled and provided to the spectator client 510. Corresponding instructions for obtaining and providing that new stream to the spectator client 510 can be subsequently executed. In another embodiment, a request to switch between matches 540A may generate instructions for the HUD application 520 so that updated HUD information can be generated and provided to the spectator client 510 regarding the new match being viewed.

As described above, HUD data processing (via the HUD application 520) may be specific to a particular location or user requesting the stream. In this way, HUD data—which may be processed and incorporated into the stream as an overlay on the view of the game environment—may be customized. Viewer specific data such as the viewer's current location, device, and preferences may be tracked by the cloud network and used to filter through game data. For example, a specific location may be associated with a particular team or player. The HUD generated for the projection stream to that location may therefore be filtered and presented from a team-specific perspective. For example, statistics or notifications related to the specific team can be provided to a user at a first location whereas different statistics or notifications may be sent to other users at a different location. The HUD application 520 is also capable of generating messages corresponding to events that occur within the game. For example, score changes may be presented to viewer as customized messages based on the perspective—e.g., either "you're falling behind" to the losing team or "you're pulling ahead" for the winning team. These customized messages can be customized and provided to the viewers based on each team and their respective different locations. As noted before, such an overlay is generated by the HUD application 520 and incorporated into the stream itself (as viewed with the spectator client 510). Therefore, it is possible that the streams can be generated on an individualized basis within the cloud network for each viewer based on their specific information.

How the stream and HUD appears for the spectators on their respective viewing devices is coordinated by the visualization master 550. The visualization master 550 receives and responds to stream requests (e.g. switch stream 540B) from various viewers on their viewing device. The viewer stream requests may either expressly request customization based on each viewer, or in some cases, may include certain customizations that are automatically provided based on parameters such as location, team affiliation, user profiles, and preferences. The available game data via the gaming network, any of the gaming devices, or any other device in network environment may also be filtered and used to generate a custom stream and/or incorporate additional information with the custom stream. The custom stream may further be sent to the transcode server 560, which encodes the custom stream for a particular viewing device or projection display device.

During a game, updated game data may result in updated information to be incorporated into the HUDs where such updated information may include real-time statistics (e.g. score changes) about each player and team within the game. The cycle of receiving user inputs, processing the game and user inputs in the cloud network, and streaming updated game data and HUD information to the players and viewers is continued until the game ends.

Figure 6:
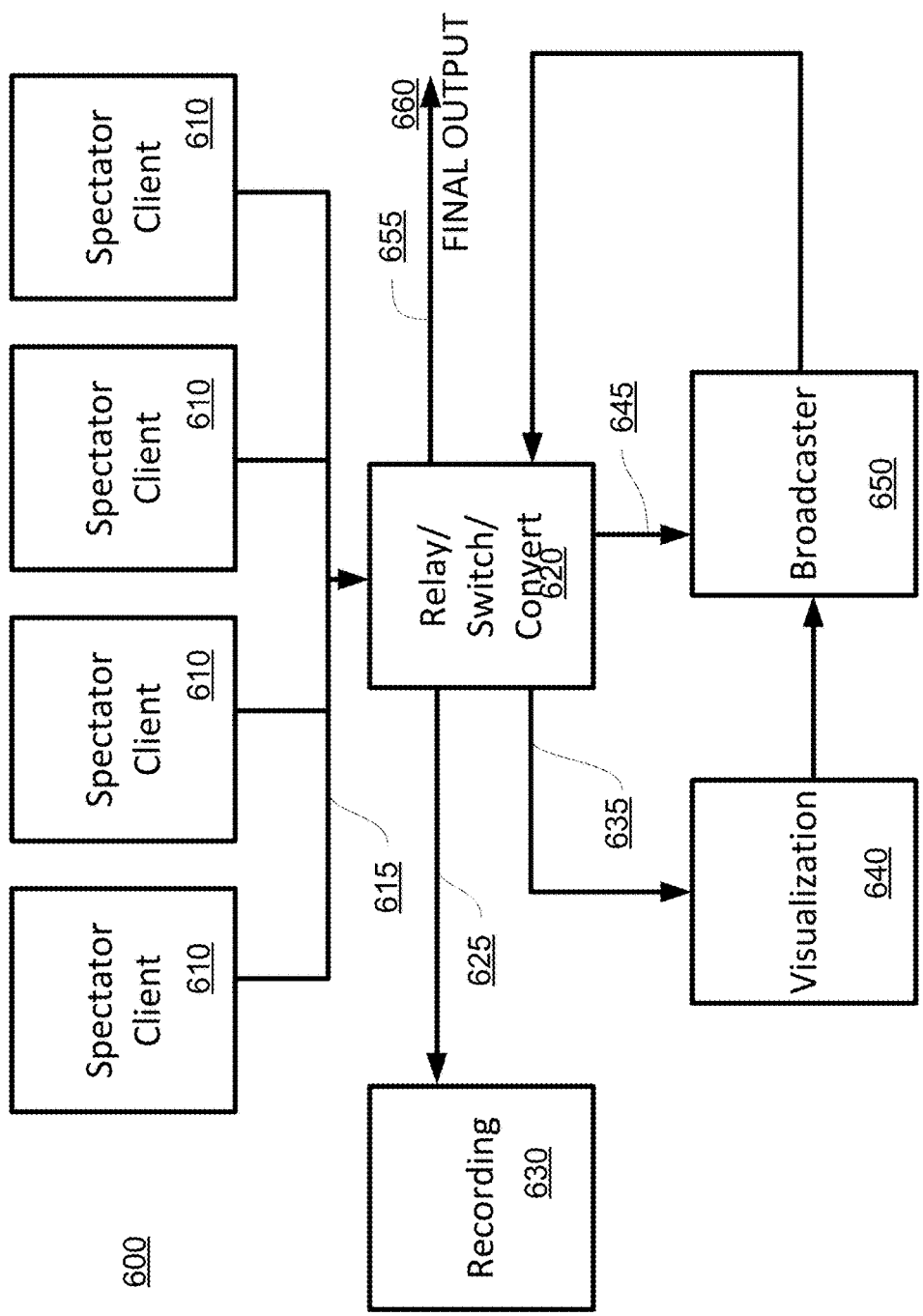
FIG. 6 is a diagram of streaming content traffic in the cloud.

FIG. 6 is a diagram 600 of streaming content traffic in the cloud network. Each of the arrows 615, 625, 635, 645, 655 in the diagram represent possible video content traffic associated with a single instance of a network game and streams of the network game for broadcasting content from the spectator devices. For example, arrow 615 represents the traffic of the video content of the network game associated with each of the spectator clients 610 being sent to the stack of virtual machines 620. Arrow 625 represents the traffic of selected video content from the spectator client 610 chosen by the stack of virtual machines 620 to be recorded at a recording module 630. Arrow 635 represents the traffic of selected video content chosen to be modified with additional information (e.g. overlays) at a virtualization module 640. Arrow 645 represents the traffic of selected video content chosen to be provided to specific computing devices associated with broadcasters at a broadcasting module 650 for the purpose of providing functionality for assisting casting (e.g. adding commentary and additional information) to streams of an event. Arrow 655 represents the traffic of selected video content chosen to be broadcasted 660 to viewers.

In the past, broadcasting of content would require specialized hardware at one or more different locations that would process, record, and broadcast the content to viewers. However, with the cloud network, the specialized hardware is emulated within the cloud network so that the necessary functions performed by the specialized hardware are readily available in the cloud. There would be no need for the specialized hardware to exist at a physical location.

Each of the spectator clients 610 may represent a graphical processing unit that is used to run instances of the network game during a single event (e.g. e-sport event). Although only four instances are currently illustrated in the figure, there may be embodiments that may have differing number of spectator clients 610 (e.g. hundreds).

Because of these instances from the spectator clients 610 may contain video content that viewers may be interested in viewing, there is a need to identify and specifically select which content stream from the various spectator clients 610 would need to be selected. In order to choose which video content is processed (635, 645), recorded 625, and/or broadcasted 655 to viewers, each of the instances from the spectator clients 610 are pushed to a stack of virtual machines 620 that act as a number of switches, relays, and converters that are used to identify and select the applicable instances from the various spectator clients 610. The stack consists of a number of different levels that are interoperable.

The stack of machines 620 selects some or all of the streams coming from the spectator clients 610 that would 1) be recorded (at a recording module 630) that would save the streams in memory for subsequent viewing, 2) analyze the information associated with the streams and modify the streams to include various overlays and graphics to supplement the stream for viewers (at a visualization module 640) where such additional information may include game data, 3) provided broadcaster-related functionalities via the broadcaster module 650, and/or 4) broadcasted to viewers 660. The streams can be broadcasted to a web-capable device (such as a projector of FIG. 2) that receives the stream and subsequently displays the stream for viewers. Because having a web-capable device and a display for the display of the broadcasted stream are the main requirements for streaming the network game, various venues can easily be set up and run without the need for specialized hardware and/or software. This allows the cost in terms of hardware, software and/or personnel to be minimized as well as minimize the amount of time and effort needed to set up the streams for viewing events at these different venues as well.

Since the cloud is capable of running multiple instances of content streams in the cloud simultaneously, the video traffic within the cloud could be an issue. One would think that there is a need for large amounts of bandwidth in order to ensure that the video content can be received from the spectator clients, processed in the cloud, and transmitted back to the spectator clients with minimal delay. However, with the way streaming content is scheduled, it is possible to provide the video content streams to viewers with low latency.

Figure 7:
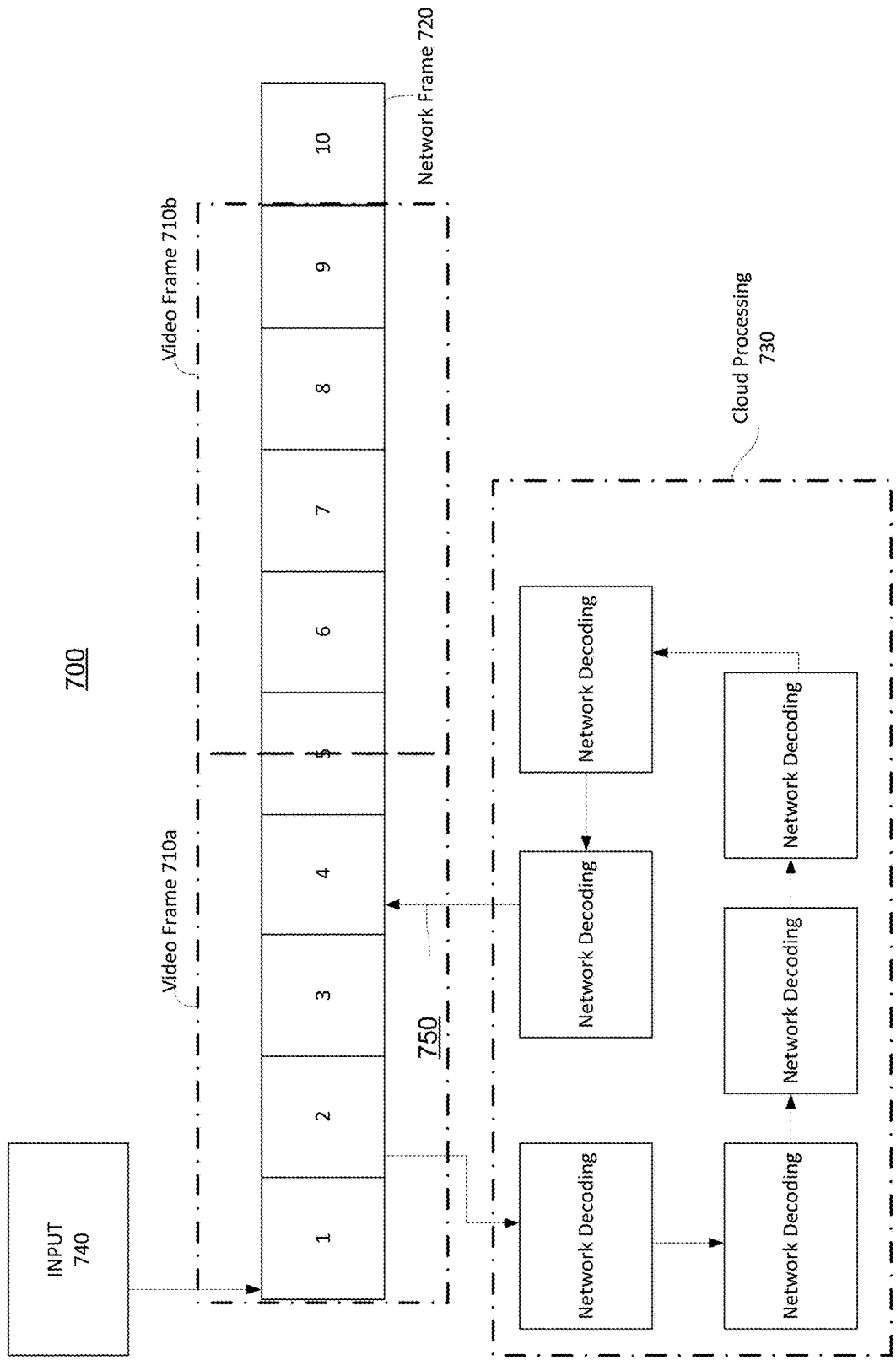
FIG. 7 illustrates scheduling of the streaming content.

FIG. 7 illustrates scheduling 700 of the streaming content. Specifically, the figure shows the timing between when video content (after being received) would need to be finished with processing so that the cloud network is able transmit the video content stream back to the spectator clients with low latency.

With implementation of components within the cloud which do not traditionally live in the cloud, there are additional processing and traffic that needs to be taken into account with the network. For example, the previous use of audio/video cables in your system that was previously used to connect different computing systems now needs to be performed in the cloud to simulate the same function. The increased requirement for emulation and resultant traffic needs to be accounted for. The processing can be represented via the exemplary processing 730 in the figure although more or less can be included based on the needs of the network. In any case, the way the video content is scheduled for delivery can be used to improve performance of the network without the additional need for buffering.

As illustrated in the figure, scheduling the transmission of video content involves two different time periods of interest. For example, in a scenario where video content is transmitted to spectator clients at 30 frames per second (fps), a first time period corresponds to each of the video frames 710a, 710b which represent when the cloud network receives video content from the sources (e.g. gaming device). The second time period corresponds to the network frame rate 720 that corresponds to when the network transmits content (e.g. to spectator clients).

With the emulation that is now performed within the cloud network, the video content undergoes various processing 730 between the time that an input is provided 740 (e.g. that identifies content to be processed) and when the video content is in a form that can be streamed 750. FIG. 7 illustrates exemplary processing 730 that can be performed in the cloud network but more or less processing can be included as known in the art. Regardless of what processes 730 are involved, the scheduling of the video content would need the video content to be ready for transmission in accordance with any network frame 720 (e.g. network frame 4) prior to the next video frame 710b so that the video content associated with the first video frame 710a can be provided to spectators (with low latency). If the video content associated with the first video frame rate 710a is provided at a network frame (e.g. network frame 5-10) that coincides with the next video frame 710b or future video frames, there may be situations where two or more video frames associated with processed video content that would be ready for transmission during the same network frame. If this occurs, the transmission of network frames would be delayed thereby affecting how the content would be displayed for the spectators.

Figure 8:
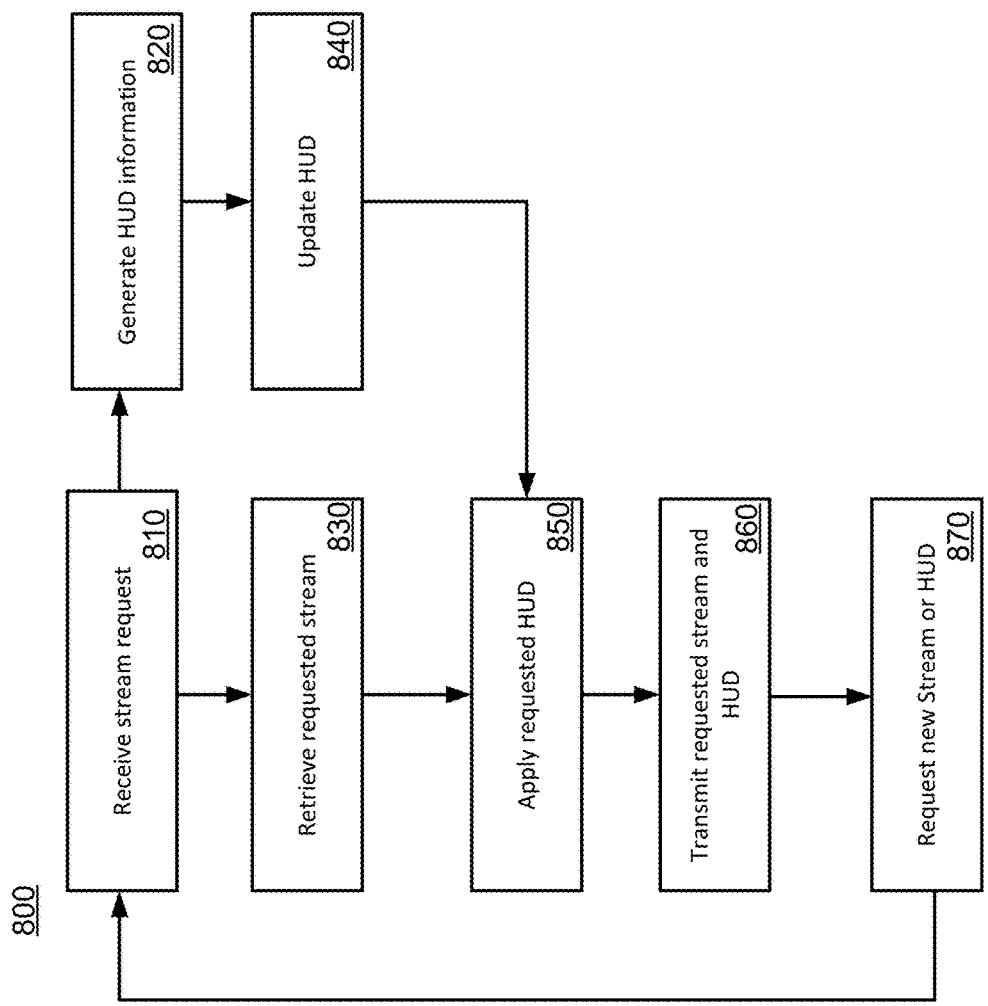
FIG. 8 is a method for cloud-based streaming of network games.

FIG. 8 is a flowchart illustrating a method 800 for cloud-based game streaming. With the multiplayer online game being established and run in the cloud network (as illustrated in FIG. 1), information related to the game can be readily accessible for streaming to various viewers on their respective viewing device, or alternatively on a projection device (e.g. movie theater screen) capable of connection to the Internet. Since the information related to the game is also available in the cloud network, customized streams for each viewer and/or location can be more easily generated as the same underlying information can be used for generating multiple streams.

In step 810, a viewer provides a request to view a stream from the cloud network. This request can be provided via a viewing device. Exemplary viewing devices can include gaming consoles, laptops, desktops, tablets, and mobile devices. So long as the viewing device is able to connect to the Internet (or the communication network as illustrated in FIG. 1), the viewing device would be able to receive the stream from the cloud network and display the stream for the viewer.

When the viewer provides the request to view a stream, the request may include information about the viewer and/or viewing device for which the stream will be transmitted to. For example, such information may include user specific information such as the viewer's physical location (e.g. city of residence, viewing location) and any viewer preferences (e.g. favorite player, favorite team). The viewer specific information would be used to customize the type of information that would be displayed along with the stream in a heads-up display (or HUD). In an embodiment, if the viewer has a favorite player or team, information specific to that player or team may be provided in the stream that is distinguishable from other viewers who do not share that preference.

Information provided in the request may also include details associated with the viewing device such as its features (e.g. display size, display preferences) and connection to the Internet. Viewing device specific information can be used to customize how the stream is generated and provided to the viewer on their viewing device. Furthermore, the speed at which streaming information can be provided to the viewer (e.g. bandwidth, network connectivity) can also be used to generate an appropriate quality of stream so as to minimize skipping or pauses during the play of the stream.

In step 820, the cloud network will also begin generating information specific to the viewer and related to the requested stream to be displayed in a heads-up display (or HUD) based on the stream request (in step 810). As discussed above, custom information can be generated for the viewer based on, for example, viewer preferences (e.g. favorite team, favorite player) and location. For example, if the viewer is located in or is viewing the game near Los Angeles, information about the team located in Los Angeles may be automatically provided to the user in the heads-up display. Other information, such as advertisements, can also be provided based on the viewer's preferences or location as the stream is playing. For example, if an event occurs within the stream (e.g. the viewer's favorite player scoring or the user's favorite team winning), advertisements related to the team could be provided (e.g. information about team-related products, discounts for team-related products). The customized information can be used to update the HUD for the viewer in step 840 (below).

In step 830, the cloud network retrieves the requested stream that the viewer wishes to view (provided in the stream request in step 810) and combines the requested HUD information (in step 850) to the stream along with the customized information (provided in step 820 and updated in step 840). The stream and the HUD is transmitted to the viewer in step 860. All the necessary processing to format the stream and/or the customized information displayed with the HUD is performed within "the cloud." This allows the viewing device to merely receive the information from cloud network and display for the viewer. By only requiring the viewing device to receive and display the stream, this minimizes the hardware and/or hardware related requirements of the viewing device so that a wider range of viewing devices can be used.

In step 870, viewers may provide requests to switch viewing of different streams. Much like changing channels while watching cable television, viewers would be able to swap between different streams. Since multiple streams can be run and maintained in the cloud network simultaneously regarding different games or different instances of different games, viewers would be able to view (for example, via a menu) of all available streams in the cloud network and request viewing of another stream. Based on the request (in step 870), the cloud network retrieves the newly requested stream (by repeating steps 810 and 830) and provides the new stream and any updated information for the HUD to the viewer (repeating steps 820, 840, and 850). There is no need to generate a viewer specific stream upon receiving a request from the viewer in step 870. The cloud network may also store information related to each viewer (e.g. viewing device capabilities, user viewing preferences) so that new streams can be readily processed and provided to the viewer with minimal delay.

Figure 9:
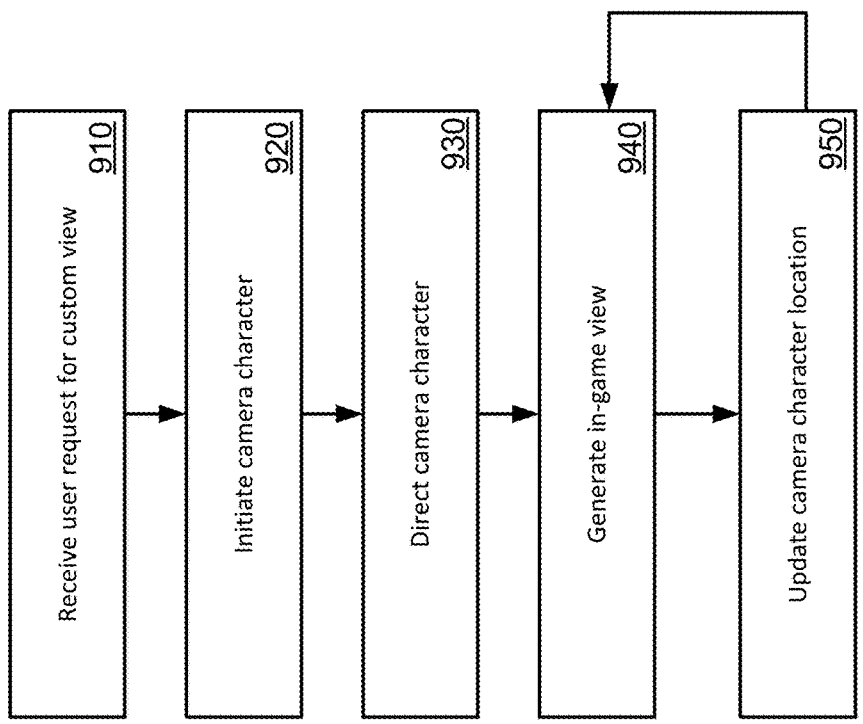
FIG. 9 is a method for custom views for streamed games.

FIG. 9 is a method 900 for custom views within cloud-based games. Although some multiplayer online games may have a number of different spectator views available already built in (e.g. first person, third person, 2.5 dimensional views), viewers may request specific views that may not be specifically available. For example, a viewer may wish to follow a specific player or group of players that is not covered in the different spectator views currently available within the online game. Alternatively, the viewer may wish to view specific events as they occur within the online game. With the features of cloud network having the game information accessible therein, instructions can be generated and executed by the cloud network that can be used to interact with the online games to provide the custom views. In an embodiment, the cloud network could execute instructions that would have the cloud network participate in the online game and request a custom character that would be used as a camera of sorts. The custom camera characters can then be used by the cloud network in accordance to the user's view request. If the user requests views of a specific player, the cloud network can control the in-game character to follow and provide views of that specific player. If the user requests views of specific events, the cloud network can monitor for that specific event and move the in-game character to the location of the detected event in order to provide the requested view. If other viewers (apart from the viewer who requested the custom view) also request the same view, the custom view can be easily provided/shared to these other viewers as well. It may also be possible to provide a list of available custom views currently being executed by the cloud network so that other viewers can choose an interesting view to see. If another viewer chooses the same custom view (e.g. requesting to view the same player or event), the cloud network can 1) provide a notification that the view already exists, and 2) share the corresponding custom view to the viewer.

In step 910, the viewer requests a custom view of an ongoing game in "the cloud." The requested custom view can be based on any number of different criteria within the multiplayer online game. The viewer may wish to follow a specific team or player. Perhaps the viewer may wish to only view when specific events occur. These view requests may be distinct from what is readily available within the confines of the game which may generally have a default view or views.

In step 920, instructions for initiating a camera character within the online game are generated. The instructions would be used to initiate and maneuver an in-game character within the online game that would be used as a camera. The camera character could be an option within the online game that allows for non-playable characters so that the cloud network could obtain different views from within the game. The non-playable character would be restricted by the online game so as to prevent interaction or interference with other players within the multiplayer online game. However, this non-playable character would be provided additional characteristics (such as invisibility, flight, teleportation) that allow the camera character to perform actions not possible by those players participating within the multiplayer online game such as the ability to move more quickly or instantaneously to different locations within the game environment in order to obtain different views from within the game environment.

In situations where the online game does not have the feature of creating the camera character described above, it may be possible that the cloud network generates/creates images depicting the requested view using game data and game-related resources. Since the cloud network includes information and resources needed to initiate, run, and manage the online games, this would mean that the cloud network has access to information such as character and object models associated with the game so that the cloud network could create and render a different game environment using the game data that corresponds to the requested view of the viewer. Alternatively, the cloud network could utilize non-game resources to generate and render images (e.g. map, outline) that correspond to a view of the online game corresponding to the viewer request (e.g. overhead map identifying relative position of all participating players in a race).

In step 930, instructions are provided by the cloud network to the camera character to move or re-locate the camera character to different locations in order to obtain information regarding the custom view for the viewer. The instructions can be based on pre-determined conditions or criteria such as the detection of certain events. The camera character can also be manually controlled by the viewer so that the viewer is able to choose what he/she wishes to view within the game environment as the multiplayer online game is occurring.

In an alternative embodiment, a set of rules (or artificial intelligence) can be used to control where the camera character is situated to obtain the best view possible for the viewer. For example, rules may identify particular events or players that the viewer would like to view as well as corresponding distances the camera character should be situated in order to capture the event or players within the game. Viewer preferences can also be used to influence the rules (or artificial intelligence) to view specific teams, players, or events as well as customize how the view is provided. For example, if a viewer has a favorite player, the camera character can be instructed to automatically follow that player within the multiplayer online game. If an event is detected as occurring within the game, the camera character can automatically be moved to an overhead position that provides the viewer with a broader view of the event that incorporates as many players as possible.

If there are multiple rules or preferences that viewers may have in what they would like to view, these rules or preferences can be ranked according to a hierarchy that can be used to identify what view should be obtained (if multiple events or players are detected simultaneously). The hierarchy can be modified over time so that the viewer can be provided different views of different players or events (for variety sake). As described above, the ranking can be modified using some sort of rate of decay (or weight) that modifies the rank each time a player or event is shown during a period of time so that other players or events become higher ranked in the overall hierarchy. The rate of decay (or weight) can revert or be reset after a predetermined period of time. Furthermore, viewers would be free to modify the hierarchy or rate of decay (or weight) prior to the start of the game as well as during the progression of the game being viewed.

In step 940, the custom view for the viewer is generated by the cloud network based on the information obtained from the camera character within the online game. The camera character obtains information about the view within the game environment that is subsequently processed by the cloud network into a form that can be transmitted to the viewer on their viewing device. Additional information related to the custom view can also be generated and packaged with the custom view within the cloud network into a stream that is provided to the viewer (similar to the steps in FIG. 8). The underlying stream would be available for other viewers to view as well and can be used to customize views for those other viewers based on their respective preferences.

In step 950, the camera character can be directed to move to a different location or event or to follow a different character. As described above, a hierarchy can be used to identify what custom views of an event or player can be provided to the viewer if the viewer has multiple preferences of what they would like to see within the game environment (e.g. particular players or events). The camera character can be instructed to move automatically to a different view after a pre-determined period of time or upon request of the user. The camera character can also be instructed to be moved to a different view by one or more viewers.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A system for generating custom views within a cloud-based game, the system comprising:
 a server that stores information for generating custom views within a cloud-based multiplayer game title; and
 one or more virtual machines associated with an Internet-connected server, wherein the one or more virtual machines are executed to:
  receive a first custom view request from a viewing device associated with a gameplay session of the cloud-based multiplayer game title;
  initiate a custom camera character that obtains view-based information within the gameplay session;
  direct the custom camera character to a location within an environment of the cloud-based multiplayer game title based on the first custom view request, the custom camera character obtaining view-based information associated with the location;
  generate a view of the gameplay session in response to the first custom view request using the obtained view-based information;
  transmit the generated view to the viewing device;
  receive a second custom view request from a second viewing device;
  determine that the second custom view request matches the first custom view request; and
  transmit the generated view that had been generated in response to the first custom view request to the second viewing device.

2. The system of claim 1, wherein directing the custom camera character is performed automatically using a set of rules that identify where to situate the custom camera character in order to obtain the view-based information in accordance with the first custom view request.

3. The system of claim 2, wherein the set of rules includes viewing preferences regarding one or more of a favorite player or specific event.

4. The system of claim 2, wherein the set of rules is ranked based on a hierarchy, wherein the ranking is used to select a view from a plurality of different views when multiple rules are detected within a period of time, and wherein the view-based information corresponds to the selected view.

5. The system of claim 2, wherein the one or more virtual machines are further executed to:
 receive information regarding the viewing device associated with a set of viewing preferences;
 analyze video content generated based on gameplay of one or more different users participating in a second gameplay session of the cloud-based multiplayer game title;
 identify a subset of the analyzed video content that meet the set of preferences associated with the viewing device;
 provide the identified subset of the analyzed video content to the viewing device; and modify a display of the video content to incorporate contextual information based on a set of preferences associated with the viewing device, wherein a set of player data is included in the contextual information in accordance with the set of preferences.

6. The system of claim 5, wherein the one or more virtual machines are configured to emulate hardware for processing and recording the video content from each client device.

7. The system of claim 2, wherein the one or more virtual machines are further executed to:
receive a stream request from the viewing device to view a stream associated with the cloud-based multiplayer game title;
generate contextual information about the requested stream;
transmit the requested stream to the viewing device, wherein the transmitted stream incorporated the contextual information, and wherein the transmitted stream is received and displayed by the viewing device;
receive a customization request from the viewing device, wherein the customization request is to update the contextual information based on one or more participants of the gameplay session; and
update a display of the stream provided to the viewing device in accordance with the updated contextual information.

8. The system of claim 7, wherein the customization request received by the one or more virtual machines includes information specific to a viewer associated with the viewing device, and wherein the display of the stream is further updated based on the information specific to the viewer.

9. A computer-implemented method for generating custom views within a cloud-based game, the computer-implemented method comprising:
storing information for generating custom views within a cloud-based multiplayer game title;
receiving, by one or more virtual machines associated with an Internet-connected server, a first custom view request from a viewing device associated with a gameplay session of the cloud-based multiplayer game title;
initiating, by the one or more virtual machines, a custom camera character that obtains view-based information within the gameplay session;
directing, by the one or more virtual machines, the custom camera character to a location within an environment of the cloud-based multiplayer game title based on the first custom view request, the custom camera character obtaining view-based information associated with the location;
generating, by the one or more virtual machines, a view of the gameplay session in response to the first custom view request using the obtained view-based information;
transmitting, by the one or more virtual machines, the generated view to the viewing device;
receiving, by the one or more virtual machines, a second custom view request from a second viewing device;
determining, by the one or more virtual machines, that the second custom view request matches the first custom view request; and
transmitting, by the one or more virtual machines, the generated view that had been generated in response to the first custom view request to the second viewing device.

10. The computer-implemented method of claim 9, wherein directing the custom camera character is performed automatically using a set of rules that identify where to situate the custom camera character in order to obtain the view-based information in accordance with the first custom view request.

11. The computer-implemented method of claim 10, wherein the set of rules includes viewing preferences regarding one or more of a favorite player or specific event.

12. The computer-implemented method of claim 10, wherein the set of rules is ranked based on a hierarchy, wherein the ranking is used to select a view from a plurality of different views when multiple rules are detected within a period of time, and wherein the view-based information corresponds to the selected view.

13. The computer-implemented method of claim 9 further comprising;
receiving, by the one or more virtual machines, information regarding the viewing device associated with a set of viewing preferences;
analyzing, by the one or more virtual machines, video content generated based on gameplay of one or more different users participating in a second gameplay session of the cloud-based multiplayer game title;
identifying, by the one or more virtual machines, a subset of the analyzed video content that meet the set of preferences associated with the viewing device;
providing, by the one or more virtual machines, the identified subset of the analyzed video content to the viewing device; and
modifying, by the one or more virtual machines, a display of the video content to incorporate contextual information based on a set of preferences associated with the viewing device, wherein a set of player data is included in the contextual information in accordance with the set of preferences.

14. The computer-implemented method of claim 13, wherein the one or more virtual machines are configured to emulate hardware for processing and recording the video content from each client device.

15. The computer-implemented method of claim 9, wherein the one or more virtual machines are further executed to:
receive a stream request from the viewing device to view a stream associated with the cloud-based multiplayer game title;
generate contextual information about the requested stream;
transmit the requested stream to the viewing device, wherein the transmitted stream incorporated the contextual information, and wherein the transmitted stream is received and displayed by the viewing device;
receive a customization request from the viewing device, wherein the customization request is to update the contextual information based on one or more participants of the gameplay session; and
update a display of the stream provided to the viewing device in accordance with the updated contextual information.

16. The computer-implemented method of claim 15, wherein the customization request received by the one or more virtual machines includes information specific to a viewer associated with the viewing device, and wherein the display of the stream is further updated based on the information specific to the viewer.

17. At least one non-transitory computer readable medium comprising instructions, the instructions, when executed by one or more virtual machines associated with an Internet-connected server, cause the one or more virtual machines to:

receive a first custom view request from a viewing device associated with a gameplay session of a cloud-based multiplayer game title;

initiate a custom camera character that obtains view-based information within the gameplay session;

direct the custom camera character to a location within an environment of the cloud-based multiplayer game title based on the first custom view request, the custom camera character obtaining view-based information associated with the location;

generate a view of the gameplay session in response to the first custom view request using the obtained view-based information;

transmit the generated view to the viewing device;

receive a second custom view request from a second viewing device;

determine that the second custom view request matches the first custom view request; and transmit the generated view that had been generated in response to the first custom view request to the second viewing device.

18. The at least one non-transitory computer readable medium of claim 17, wherein directing the custom camera character is performed automatically using a set of rules that identify where to situate the custom camera character in order to obtain the view-based information in accordance with the first custom view request.

19. The at least one non-transitory computer readable medium of claim 17, wherein the one or more virtual machines are further executed to:

receive information regarding the viewing device associated with a set of viewing preferences;

analyze video content generated based on gameplay of one or more different users participating in a second gameplay session of the cloud-based multiplayer game title;

identify a subset of the analyzed video content that meet the set of preferences associated with the viewing device;

provide the identified subset of the analyzed video content to the viewing device; and modify a display of the video content to incorporate contextual information based on a set of preferences associated with the viewing device, wherein a set of player data is included in the contextual information in accordance with the set of preferences.

20. The at least one non-transitory computer readable medium of claim 17, wherein the one or more virtual machines are further executed to:

receive a stream request from a viewing device to view a stream associated with the cloud-based multiplayer game title;

generate contextual information about the requested stream;

transmit the requested stream to the viewing device, wherein the transmitted stream incorporated the contextual information, and wherein the transmitted stream is received and displayed by the viewing device;

receive a customization request from the viewing device, wherein the customization request is to update the contextual information based on one or more participants of the gameplay session; and update a display of the stream provided to the viewing device in accordance with the updated contextual information.

* * * * *